D. L. STILES.
Heating Stove.
No. 4,004. Reissued May 31, 1870.
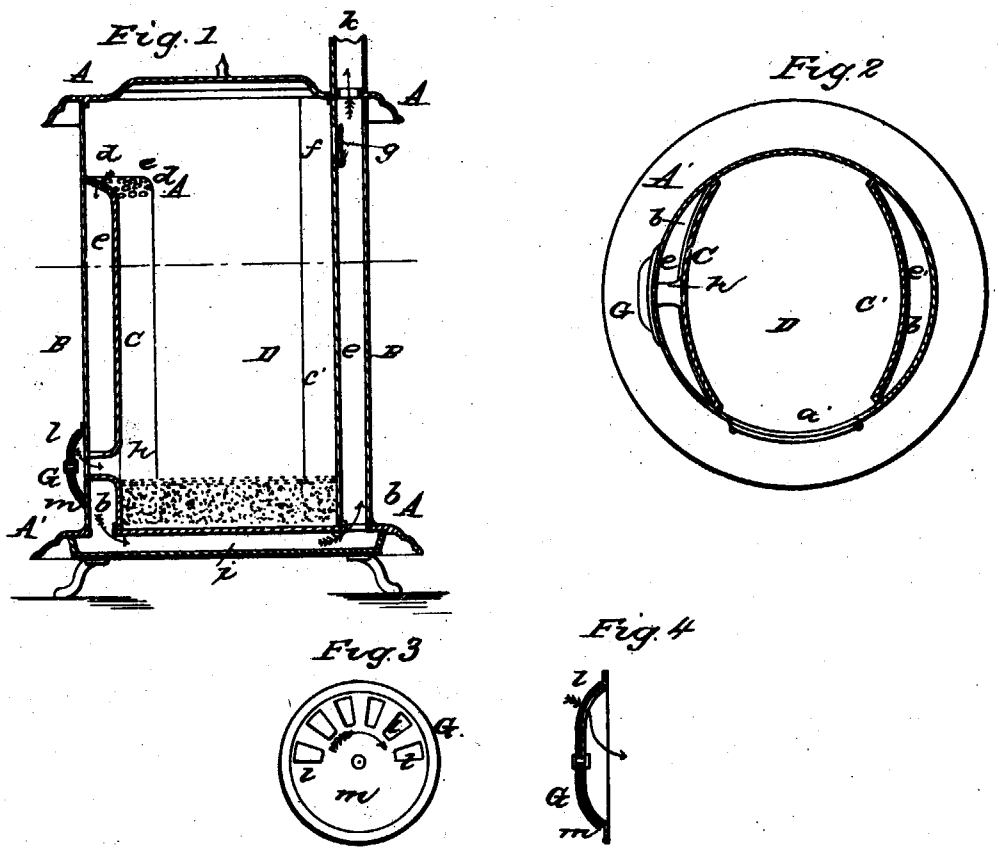
Witnesses
B. J. Fryinning
Chas. H. Cheney
Inventor
David L. Stiles
By J. Fraser & Co.
A
N. PETERS, Photo-Lithographer, Washington, D. C.

United States Patent Office.

JOHN M. FRENCH, JR., OF ROCHESTER, NEW YORK, ASSIGNEE, BY MESNE ASSIGNMENTS, OF DAVID L. STILES.

*Letters Patent No.* 40,663, *dated November* 17, 1863; *reissue No.* 4,004 *dated May* 31, 1870.

HEATING-STOVE.

The Schedule referred to in these Letters Patent and making part or the same

*To all whom it may concern:*

Be it known that DAVID L. STILES, of the city of Rochester, in the county of Monroe and State of New York, did invent a new and useful Improvement in Stoves, of which, I, JOHN M. FRENCH, Jr., also of Rochester aforesaid, am sole assignee; and I do hereby declare that the following is a full and exact description thereof, reference being had to the accompanying drawing making part of this specification.

Figure 1 is a central vertical section of the stove.

Figure 2, a transverse horizontal section of the same.

Figures 3 and 4, a front view and vertical section of the register.

Like letters of reference indicate corresponding parts in all the figures.

This stove is intended more particularly for burning wood, and is of that class in which a downward flue is employed.

The invention consists in the construction and arrangement, as hereinafter described, whereby the whole bottom of the stove is open to the passage of smoke and heated air, and an oval, oblong fire-chamber is produced, guarded on the longitudinal sides, where the heat is greatest by the flue-plates, in such a manner as to effectually prevent "burning out," and, furthermore, in the arrangement of the register.

The top and bottom, A A′, of the stove are preferably made of cast-iron, not differing essentially in general construction from the corresponding parts of ordinary cylinder stoves. The top is provided with a cover, of such size as to allow large sticks of wood to enter, and it is preferably pivoted on one side, in such a manner that it may be either turned laterally or detached entirely from place.

The two parts, A A′, are connected by an ordinary sheet-iron cylinder, B, of suitable size, provided on one side with a door, *a*, for the entrance of fuel.

The bottom casting A′ of the stove is provided, on two opposite sides, next the cylinder, respectively, with crescent-shaped openings or passages *b b*, of suitable size and extent, being represented in the drawing as each occupying somewhat less than one-third the circumference. A greater or lesser size of these openings may be employed at pleasure.

On the inner boundaries of the openings *b b*, respectively, rest upright flue-plates C C′, of similar outline, and usually made of cast-iron. The plate C, on one side, does not extend quite to the top of the cylinder, but has a deflection or turn, *c*, which abuts with the cylinder, and at this point are made holes or openings *d d*, fig. 1, for the passage of the products of combustion into flue *e*. The plate C′, on the opposite side, extends from bottom to top, and entirely cuts off its flue *e′* from the fire-chamber D, except that a smoke-exit passage, *f*, is made near the upper end, which, however, is covered by a valve or damper, *g*, operated from the outside of the stove.

On one side or the other, or both, if desired, and at suitable height from the bottom, is made a small pipe or induction opening, *h*, for the admission of air to support the combustion, and this may be covered by a register, of any desirable kind. The induction-pipe is preferably cast entire with flue-plate, and fitted by cutting a hole to receive it in the outer cylinder.

The openings or passages *b b* of the flues communicate with a space or chamber, *i*, beneath which extends under the whole bottom of the stove, and may be formed in any desirable manner. I prefer, however, to use a circular disk-shaped casting, on which the bottom A′ rests, as represented in the drawing.

The flue *e′* opens into the smoke-pipe *k* in the usual manner. In kindling a fire, the valve or damper *g* is opened, as indicated in dotted lines, fig. 1, allowing a direct passage to the smoke-pipe, but when the fire is well burning, the valve is closed, as in black lines, thus causing the smoke and heated air to pass through the holes *d d* and flue *e* downward into the space *i*, in which it circulates under the whole bottom of the stove, and thence upward into the flue *e′*, where it finally escapes at the smoke-pipe.

Among the advantages of this arrangement are the following:

First, an oval or oblong fire-chamber, D, is produced, bounded on its longitudinal sides by the flue-plates C C′, which, from their extent, receive most of the heat, and therefore prevent "burning out," as the supply of air is received midway, and necessarily, from the shape of the fire-chamber, the greatest combustion is at the center, so that the outer cylinder is protected where most exposed. Thus, the flue-plates not only inclose the flues, but also serve the double purpose of a shield or lining to protect the sheet-iron, which is not the case in ordinary downward flue-stoves.

Second, by this arrangement an oblong fire-chamber is produced, and still a plain cylinder, B, employed outside, made of sheet-iron, thus not only preserving symmetry of form, but also economizing cost.

Third, the flue-plates C C′ being concave, and therefore of so great extent of surface, receive a greater amount of heat than they would if arranged in any other way; therefore the thin sheet of air that passes through the flue is more highly heated than usual. It is also more equally distributed, as the flues occupy the major portion of the cylinder's surface, and the consequence is that the radiation is more equal and uniform.

Fourth, the space or chamber *i* occupies the whole area of the bottom of the stove, and the heated air that enters it is distributed throughout the whole extent. This renders the whole bottom of the stove comfortable and warm to the feet in cold weather, a desideratum not found in ordinary stoves; but while the effect of heating the bottom of the stove is produced, it is not overheated by positive contact with the fire, since there is a thickness of ashes between the fire and the space *i*, and it is therefore heated only to a moderate and comfortable degree.

The register G, covering the induction air-opening *h*, is of a peculiar kind. The ordinary circular pivoted register has its holes for the admission of air arranged around its whole circumference and extending to the center, leaving only room for the pivot. In this invention, these holes *l l* are made in only the upper portion of the register and their length occupying only half the radius, leaving the lower half *m* of the same entirely closed or imperforated, as shown most clearly in figs. 3 and 4. The relative position of this register with the air-pipe *h* is such that its closed or imperforated part *m* comes opposite the opening of the pipe, while the air-holes *l l* are situated above the same, as shown in fig. 1. The object of this arrangement is to keep the sparks and coals that snap from the burning wood from passing into the room, as they would do if the register were made with holes in its whole circumference, as in the usual way. The sparks or coals that pass through the pipe strike against the closed part of the register and fall to the bottom. The arrangement also prevents the passage of ashes through the induction-pipe to the floor.

I do not claim a downward flue, as I am aware that such is in common use; but

What I claim as the invention of DAVID L. STILES, and desire to secure by Letters Patent, is—

The combination and arrangement of opposite flues *e e′* in a cylinder body, B, so as to form an oblong fire-chamber, D, within and separated by curved flue-plates C C′ therefrom, one flue, *e*, descending from the upper part of said fire-chamber to a flue-space, *i*, in the bottom of the stove, and the other flue, *e′*, ascending from said flue-space to the smoke-pipe, substantially as and for the purposes herein specified.

Also, the construction of the curved flue-plate C, with a bent perforated top, *d*, and draught-pipe *h*, all cast in one piece, for the purposes set forth.

Also, the register G, having its air-holes *l l*, only in the upper portion and in the outer edge of the circle, and its closed part *m* situated opposite the draught-opening of the stove, substantially as and for the purposes herein set forth.

In witness whereof I have hereunto signed my name in the presence of two subscribing witnesses.

JOHN M. FRENCH, JR.

Witnesses:

L. J. BUNDY,

GEO. H. HUMPHREY.